Sept. 15, 1959
H. J. CLOUTHIER
2,904,292
CHRISTMAS TREE STAND
Filed May 16, 1958
3 Sheets-Sheet 1
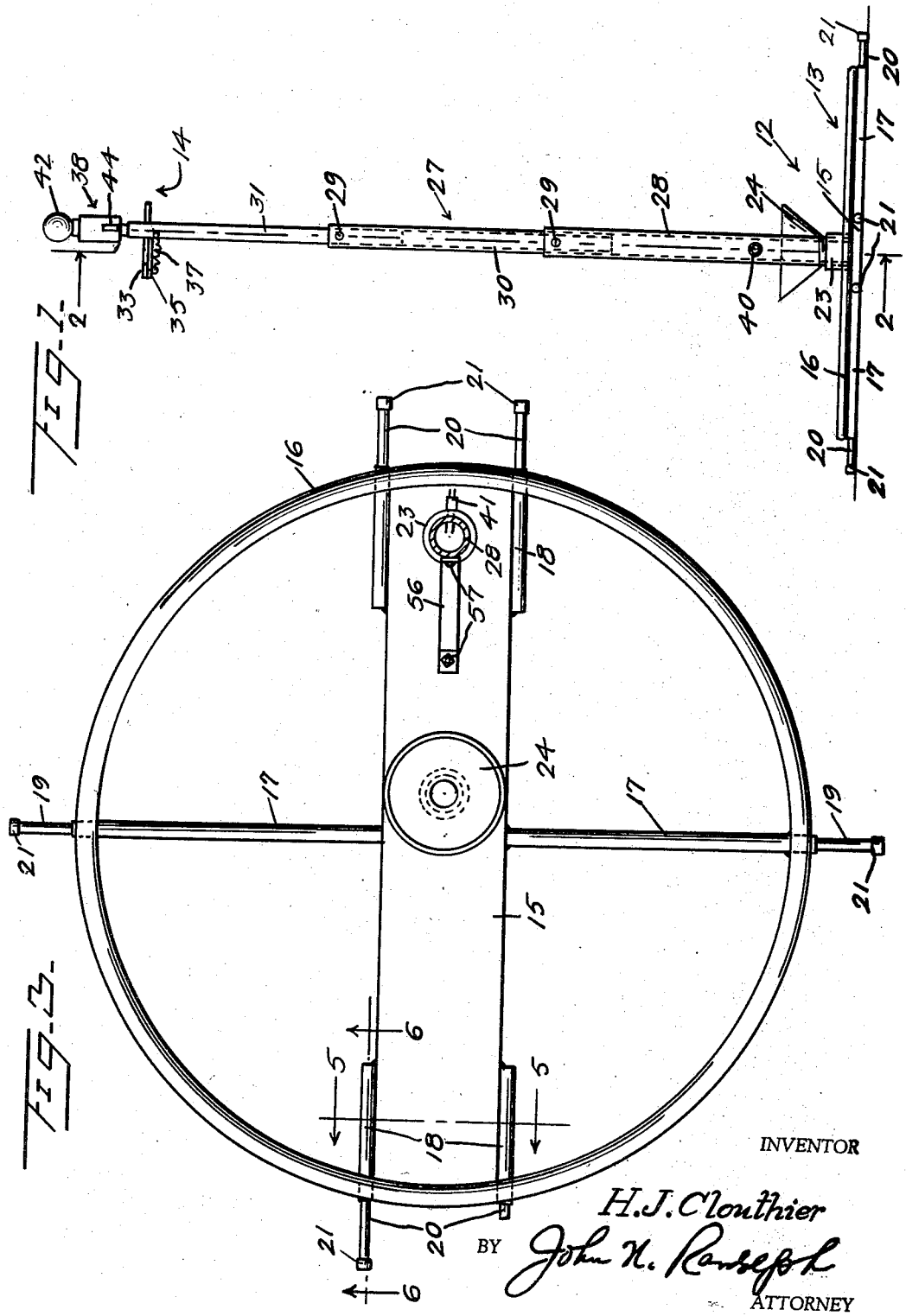
INVENTOR
H. J. Clouthier
BY John N. Randolph
ATTORNEY

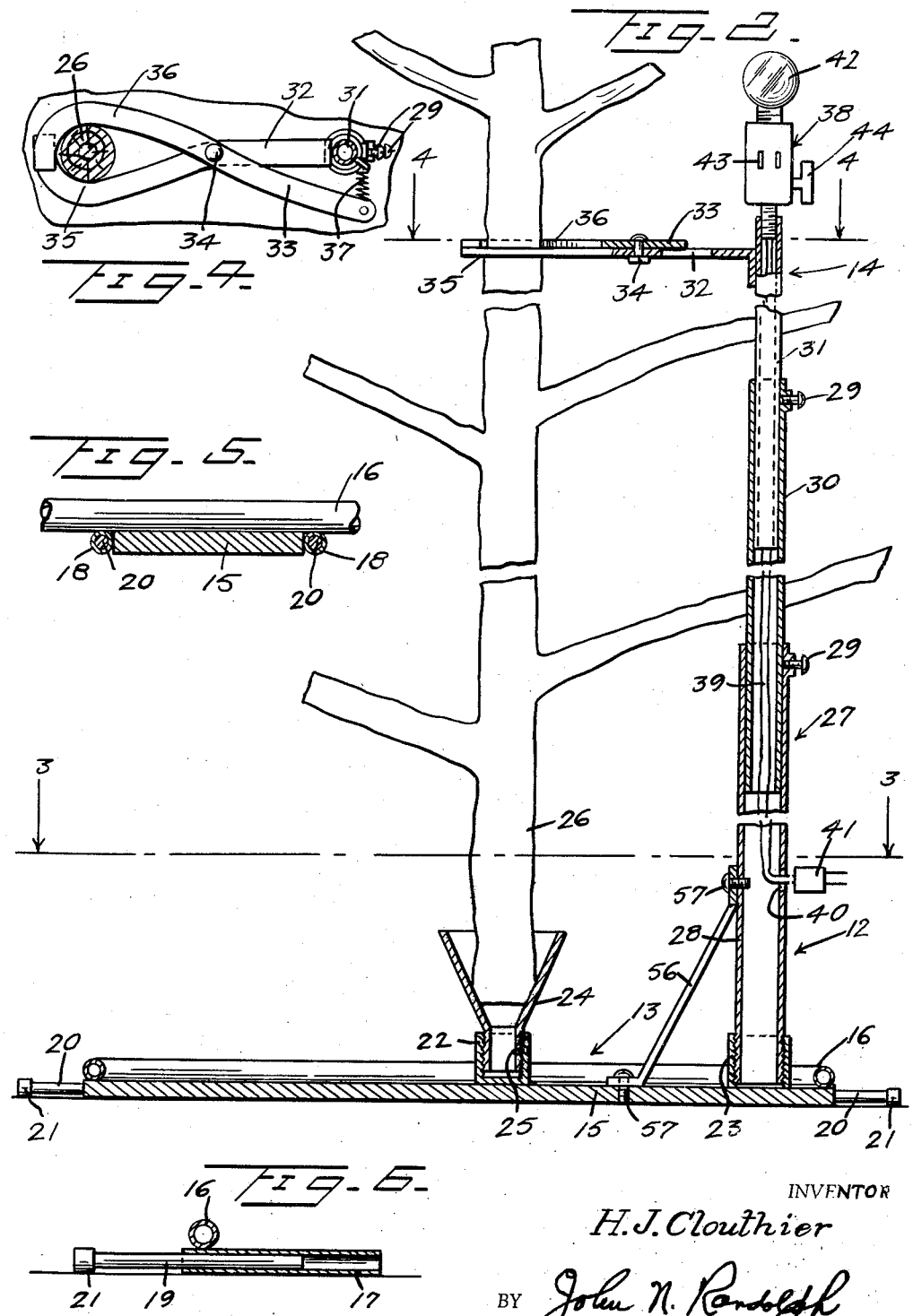

Sept. 15, 1959     H. J. CLOUTHIER     2,904,292
CHRISTMAS TREE STAND
Filed May 16, 1958     3 Sheets-Sheet 3
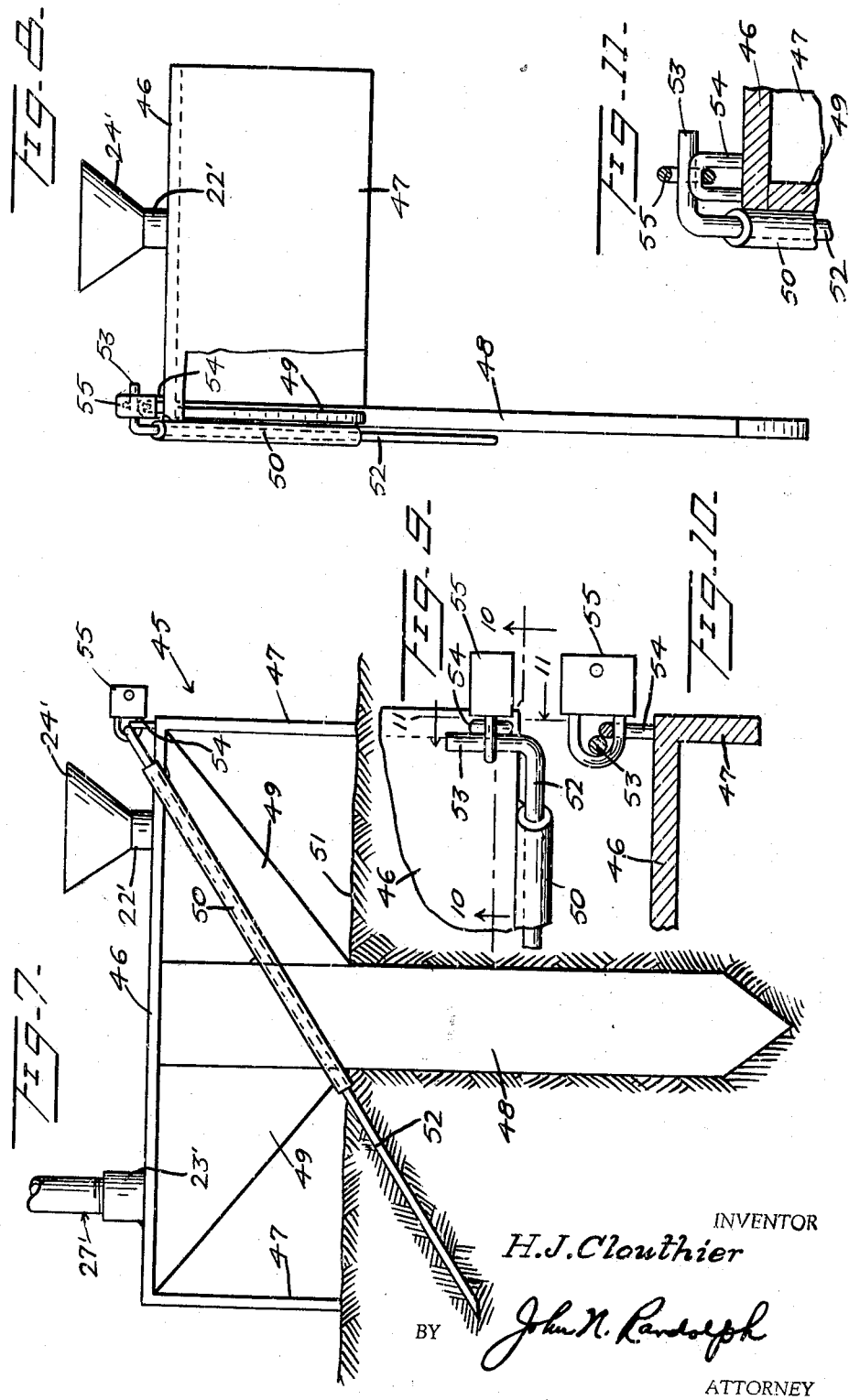
INVENTOR
H.J. Clouthier
BY John N. Randolph
ATTORNEY

United States Patent Office 2,904,292
Patented Sept. 15, 1959

2,904,292

CHRISTMAS TREE STAND

Henry J. Clouthier, Lake Linden, Mich.

Application May 16, 1958, Serial No. 735,732

3 Claims. (Cl. 248—44)

This invention relates to a novel stand for supporting a Christmas tree in an upright position and has for its primary object to provide a stand which will afford a stable support for a Christmas tree including means for bracing the tree at a point substantially above the lower end of the tree trunk.

Another object of the invention is to provide a tree stand including means for gripping and bracing the tree substantially above the level of the base portion of the stand in which the tree trunk is supported, which brace means is extensible to enable a gripping of the tree at different elevations where most convenient, depending upon the arrangement of the tree branches.

Still a further object of the invention is to provide a tree stand wherein the tree brace includes a resilient clamping member for gripping the tree trunk.

A further object of the invention is to provide a tree stand including means to facilitate and simplify the connecting of tree lighting circuits to an electric outlet.

Other objects and advantages of the invention will hereinafter become more fully apparent from the following description of the drawings, illustrating presently preferred embodiments thereof, and wherein:

Figure 1 is an elevational view of a preferred form of the Christmas tree stand;

Figure 2 is an enlarged fragmentary vertical sectional view taken substantially along a plane as indicated by the line 2—2 of Figure 1, and showing a portion of a Christmas tree supported by the stand;

Figure 3 is a horizontal sectional view taken substantially along a plane as indicated by the line 3—3 of Figure 2;

Figure 4 is a fragmentary horizontal sectional view, taken substantially along a plane as indicated by the line 4—4 of Figure 2;

Figure 5 is an enlarged fragmentary vertical sectional view, taken substantially along a plane as indicated by the line 5—5 of Figure 3;

Figure 6 is an enlarged fragmentary vertical sectional view, taken substantially along a plane as indicated by the line 6—6 of Figure 3;

Figure 7 is a fragmentary side elevational view of a modified form of the tree stand;

Figure 8 is an end elevational view, partly broken away, looking from right to left of Figure 7;

Figure 9 is an enlarged fragmentary top plan view of a portion of the structure shown in Figures 7 and 8;

Figure 10 is a fragmentary vertical sectional view, taken substantially along a plane as indicated by the line 10—10 of Figure 9, and Figure 11 is a fragmentary vertical sectional view, taken substantially along a plane as indicated by the line 11—11 of Figure 9.

Referring more specifically to the drawings, and first with reference to Figures 1 to 6, the Christmas tree stand in its entirety, as disclosed in these views, is designated generally 12, and includes a base, designated generally 13, and a brace, designated generally 14.

The base 13 includes a relatively wide substantially flat bar 15 and a ring member 16 having diametrically opposite portions which are secured to the upper sides of end portions of the bar 15. The ring member 16 is preferably tubular. Tubular arms 17 have inner ends abutting against and secured to the side edges of the bar 15, intermediate of the ends thereof, and outer end portions disposed beneath and secured to diametrically opposite parts of the tubular member 16. Said tubes 17 are disposed in alignment with one another, as seen in Figure 3. Tubes 18 are secured to and extend along the side edges of the end portions of the bar 15 and have outer ends disposed beneath portions of the ring 16. The undersides of the bar 15 and tubes 17 and 18 are disposed coplanar, as seen in Figure 1. Rods 19 telescope into the tubes 17 and rods 20 telescope into the tubes 18. Said rods 19 and 20 have heads 21 at their outer ends which are disposed beyond the outer ends of the tubes 17 and 18, respectively. The undersides of the heads 21 are disposed coplanar with the undersides of the tubes 17 and 18.

The base 13 includes an upwardly opening internally threaded socket 22 the lower end of which is secured to the upper side of the bar 15, nearly midway of the ends thereof. A second internally threaded upwardly opening socket 23 is secured to and rises from the bar 15, near one end thereof. A funnel shaped member 24 has an externally threaded neck 25 at its lower end which threadedly engages in the socket 22, said member 24 being flared from above and adjacent the socket 22 to its open upper end and combining with said socket 22 to form a receptacle in which the lower end of a tree trunk 26 is adapted to seat, and which can be filled with water to supply moisture to the tree trunk. The parts 15 to 25 of the base 13 are all of rigid construction.

The brace 14 includes an extensible tubular standard 27, the lower end of the lower section 28 of which is threadedly secured detachably in the socket 23. The standard sections are adjustably secured in different extended positions by setscrews 29 which are threaded radially into upper portions of the lower section 28 and intermediate section 30. The upper standard section 31 has a bar fixed to and projecting laterally therefrom, as seen at 32, and a bar 33 is pivotally connected intermediate of its ends to the intermediate portion of the bar 32 by a pivot element 34. The bars 32 and 33 have outer free end portions which are outwardly bowed relative to one another and which have inturned terminals forming clamping jaws 35 and 36, respectively, as best seen in Figure 4. The other end of the bar 33 is connected to one end of a strong pull spring 37, the opposite end of which is secured to the upper standard section 31, and which spring 37 urges the jaw 36 toward a closed position relative to the jaw 35 for clamping the tree trunk 26 between said jaws, as best seen in Figure 4. The clamping jaws 35 and 36 are disposed directly above the receptacle 24.

A multiple electric socket 38 is connected to and projects from the upper end of the upper standard section 31 and is connected to one end of an extension cord 39 which extends downwardly therefrom through the tubular standard 27 and outwardly through an opening 40 in the lower standard section 28. The extension cord 39 may be of any length and has a conventional plug 41 at its opposite end for connection with a conventional outlet fixture. The socket 38 is provided with a socket portion in the top thereof to receive a light bulb 42 and a plurality of electric plug receiving sockets 43. The socket 38 has a switch 44 for making and breaking an electric circuit thereto. The plug sockets 43 are adapted to be engaged by electric plugs of conventional Christmas tree lighting circuits, not shown.

The standard 27 may be provided with a brace 56 which is detachably secured thereto and to the bar 15 by fastenings 57.

It will be readily apparent that the standard 27 can be extended to any desired extent for most conveniently locating the clamping jaws 35 and 36 to engage the tree trunk 26 without interference with the tree branches. The rods 19 and 20 can be extended to a desired extent for increasing the effective size of the base 13 to afford a stable support so that tieing of the tree to maintain it securely in an upright position is unnecessary.

It will also be readily apparent that the standard 27 can be detached from the base 13 and retracted so that the parts of the stand 12 can be conveniently stored.

Figures 7 through 11 illustrate a modified form of the base, adapted for outside use, and designated generally 45. The base 45 includes an elongated rigid substantially flat bar 46 having corresponding downturned end portions 47. An elongated stake 48 is fixed to and extends downwardly from the bar 46, midway of its ends and adjacent one longitudinal edge thereof, as seen in Figure 8. The stake 48 is braced relatively to the bar or base 46 by webs 49, which do not extend below the lower ends of the depending bar extensions 47. A tube 50 is secured to the outer side of the stake 48 and to one of the webs 49 and is disposed at an incline with its lower end disposed adjacent the level of the lower ends of the bar extensions 47, and its upper end disposed adjacent the level of the bar or base 46, and near one end thereof.

The stake 48 is adapted to be driven into the ground, as seen at 51 in Figure 7, until the lower ends of the base extensions 47 rest on the ground. A long rod 52 is forced downwardly through the tube 50 and into the ground 51 at an incline, as seen in Figure 7, and to a sufficient depth for anchoring the base 45 against removal without first withdrawing the rod 52. The rod 52 has an angularly turned upper end forming a handle 53 which is positioned crosswise of the base or bar 46 and adjacent an eye or loop 54 which is fixed to and rises from an end of said base or bar 46. A padlock 55 engages the loop 54 and handle 53 to prevent the anchoring rod 52 from being withdrawn from the tube 50, without first removing the padlock 55.

The base or bar 46, adjacent one end thereof, has an upwardly opening internally threaded socket 22' to receive a receptacle 24' and which parts correspond with the socket 22 and receptacle 24, respectively. An internally threaded socket 23', corresponding to the socket 23, is fixed to and rises from the bar 46, near the other end thereof, to threadedly receive the lower end of a standard 27', corresponding to the standard 27 and forming a part of a tree brace, corresponding to the brace 14. The sockets 22' and 23' are disposed midway of the side edges of the bar 46.

Various modifications and changes, in the embodiments of the invention as disclosed, are contemplated and may be resorted to, without departing from the function or scope of the invention as hereinafter defined by the appended claims.

I claim as my invention:

1. A Christmas tree stand comprising a base, a receptacle connected to and rising from the base adapted to receive the lower end of a tree trunk, a standard connected to and rising from said base, a tree trunk engaging clamp fixed to and extending laterally from the standard and having clamping saws disposed directly above said receptacle and adapted to grip the tree trunk, said base including a substantially flat bar, tubes extending laterally from said bar and having undersides disposed substantially coplanar with the underside of the bar, rods telescopically mounted in said tubes and movable to extended positions, rods extending outwardly from the ends of said bar, means slidably connecting said last mentioned rods to the bar, and heads formed on the outer ends of the rods and having undersides disposed coplanar with the undersides of the bar for increasing the bearing surface of the base when the rods are extended.

2. A Christmas tree stand comprising a base, a receptacle connected to and rising from the base adapted to receive the lower end of a tree trunk, a standard connected to and rising from said base, a tree trunk engaging clamp fixed to and extending laterally from the standard and having clamping jaws disposed directly above said receptacle and adapted to grip the tree trunk, said base including a bar on which the receptacle and standard are supported, a ground engaging stake extending downwardly from said bar adapted to be embedded in the ground, a rigid sleeve secured to the bar and stake and disposed at an incline, a spike slidably disposed in the sleeve and having a lower end extending downwardly from the lower end of the sleeve and embedded in the ground at an angle to the stake, and locking means securing the upper end of the spike to the bar to prevent unauthorized removal of the spike from its embedded position.

3. A Christmas tree stand comprising a base, a receptacle connected to and rising from the base adapted to receive the lower end of a tree trunk, a standard connected to and rising from said base, a tree trunk engaging clamp fixed to and extending laterally from the standard and having clamping jaws disposed in vertical alignment with and substantially above said receptacle and adapted to grip the tree trunk, said base including a substantially flat bar, tubes extending laterally from said bar and having undersides disposed substantially coplanar with the underside of the bar, rods telescopically mounted in said tubes and movable to extended positions, rods extending outwardly from the ends of said bar, means slidably connecting said last mentioned rods to the bar, heads formed on the outer ends of the rods and having undersides disposed coplanar with the underside of the bar for increasing the bearing surface of the base when said rods are extended, and a rigid ring member having portions secured to the outer ends of said tubes and other portions secured to end portions of said bar for bracing the outer ends of the tubes, said ring member being disposed above the bar and tubes.

References Cited in the file of this patent

UNITED STATES PATENTS

| | | |
|---|---|---|
| 860,099 | Lohrs | July 16, 1907 |
| 919,807 | Bailey | Apr. 27, 1909 |
| 1,463,734 | Ullrich | July 31, 1923 |
| 1,854,932 | Gottlieb | Apr. 19, 1932 |
| 2,455,404 | Brown et al. | Dec. 7, 1948 |
| 2,516,760 | Doran | July 25, 1950 |
| 2,657,888 | Ericson | Nov. 3, 1953 |